United States Patent [19]  
Chisholm

[11] 3,765,922  
[45] Oct. 16, 1973

[54] METHOD OF FORMING FLOCKED ARTICLES
[75] Inventor: Douglas S. Chisholm, Midland, Mich.
[73] Assignee: The Dow Chemical Company, Midland, Mich.
[22] Filed: June 29, 1971
[21] Appl. No.: 157,828

[52] U.S. Cl................ 117/16, 117/33, 117/93.4 R, 117/101, 117/104 R, 65/8, 118/308, 156/72, 264/8, 264/143, 424/90
[51] Int. Cl............................................ B44c 1/08
[58] Field of Search............ 117/16, 104 R, 93.4 R, 117/101, 33; 118/308; 65/8; 264/8, 143; 156/72

[56] References Cited  
UNITED STATES PATENTS

| 3,424,832 | 1/1969 | Chisholm........................... 264/143 |
| 3,215,584 | 11/1965 | McConnell et al................... 117/33 |
| 3,649,408 | 3/1972 | Miller............................. 117/16 X |

Primary Examiner—Ralph Husack  
Attorney—Richard G. Waterman et al.

[57] ABSTRACT

A flocked article and method for making the same comprising centrifugally extruding thermoplastic strands or filaments of any desired thickness and length, and then impinging the rapidly moving strands or filaments on a substrate base of any desired material or combination of materials immediately after said strands or filaments are freed from an extrusion die. Direct fusion bonding of the strands or filaments to the substrate may be achieved, or bonding of the strands or filaments may be obtained by applying an adhesive or hot melt layer to the substrate base prior to impinging them thereon, or by using a heat softened thermoplastic substrate. Unique flocking apparatus is obtained by using a centrifugal extruder in combination with other means of forming the substrate base. Also, a novel flocked article may be achieved by the penetration of one end of the strands or filaments into the matrix of the substrate base prior to their bonding or fusion therewith.

4 Claims, 6 Drawing Figures

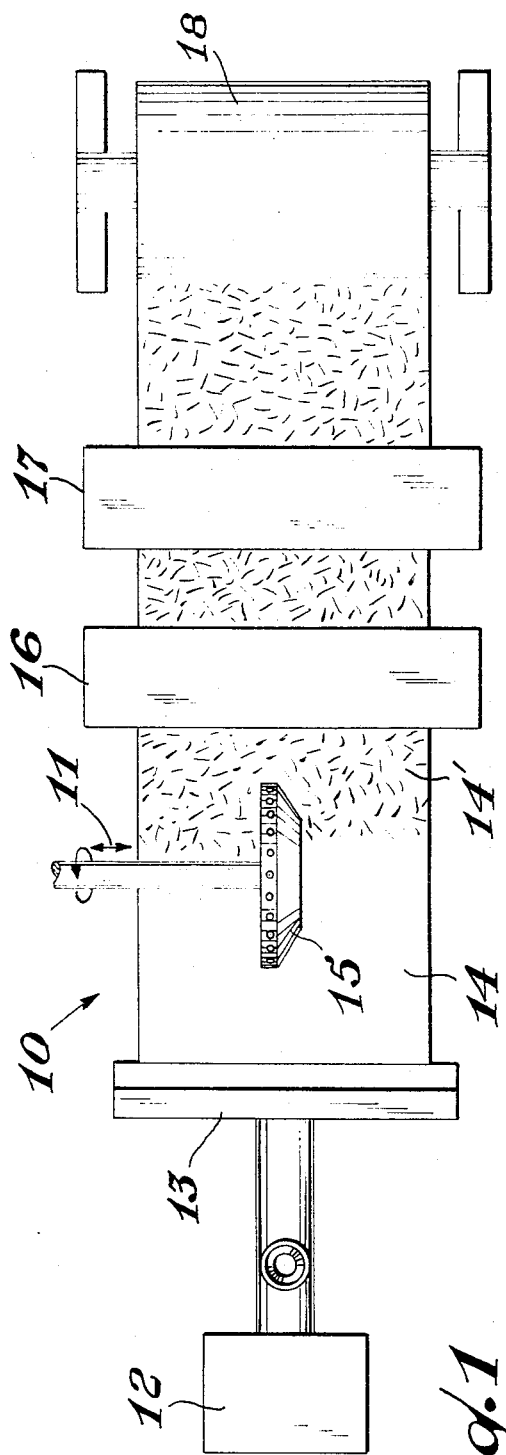
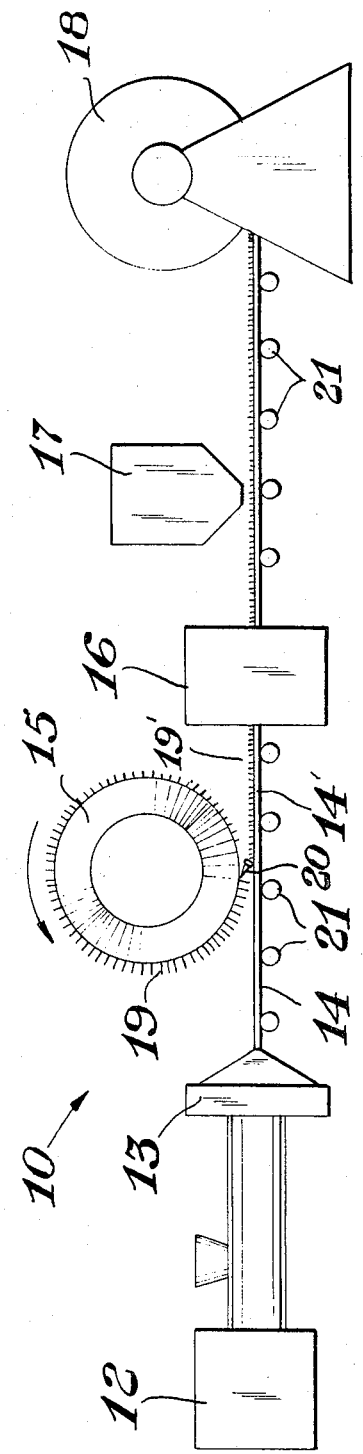
INVENTOR.
Douglas S. Chisholm
BY
Arthur J. Young.
ATTORNEY

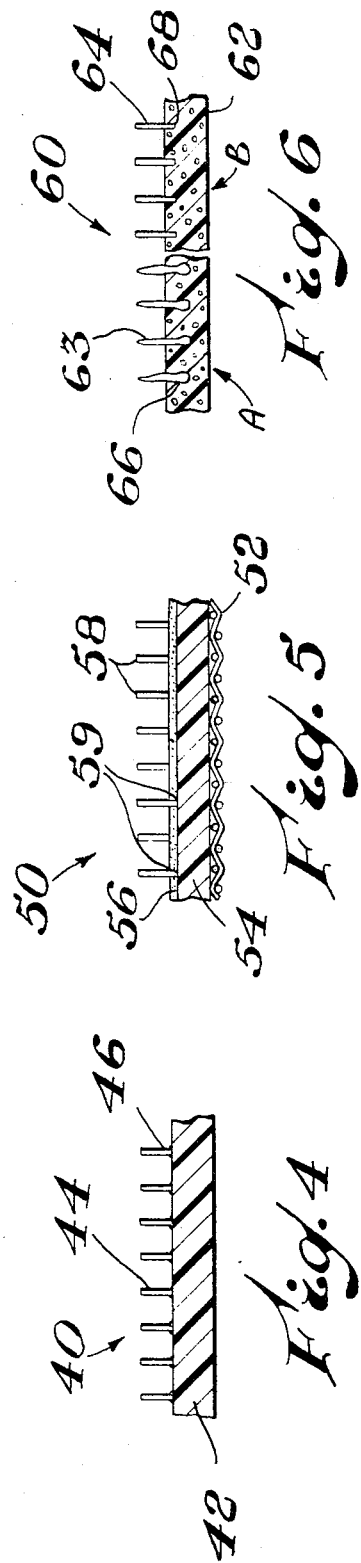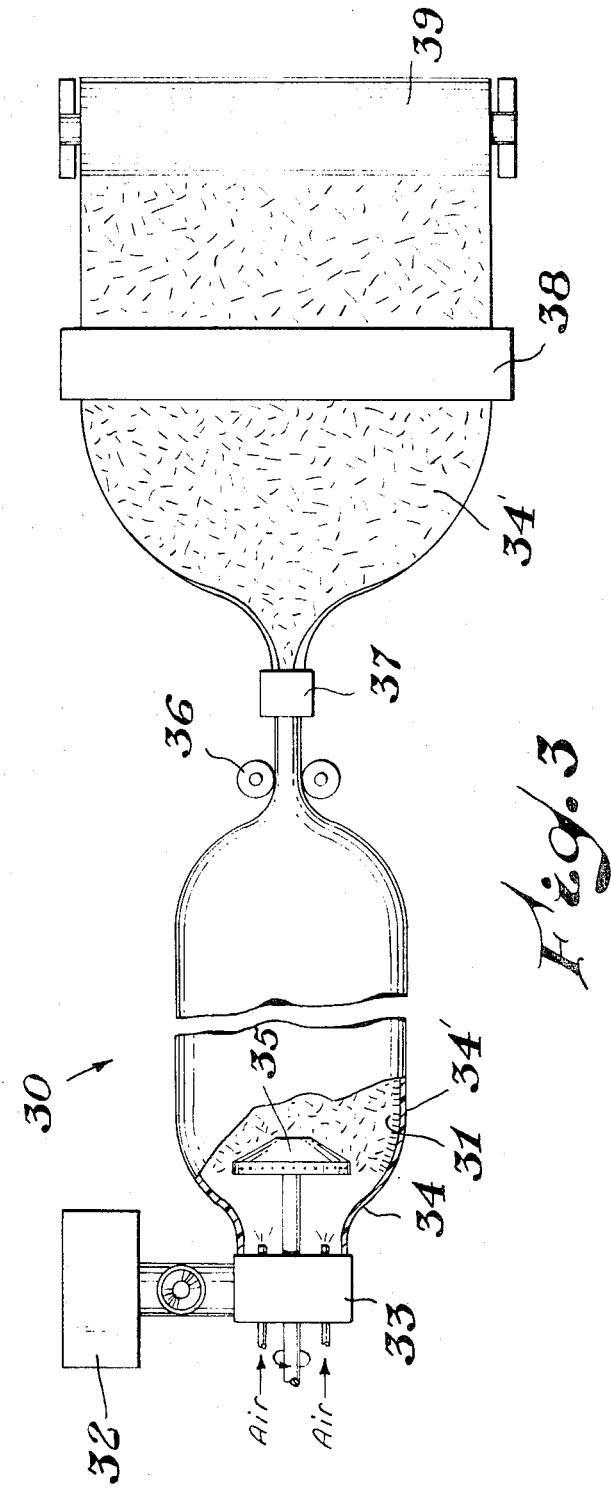

METHOD OF FORMING FLOCKED ARTICLES

BACKGROUND OF THE INVENTION

1. Field of the Invention:

The present invention relates to flocked articles, and an apparatus and method for making the same, with particular reference to centrifugally extruding thermoplastic strands or filaments and impinging them on a substrate base immediately after they have been freed from an extrusion die to form flocked articles.

2. Description of the Prior Art:

In general, many techniques have been used in the past to make flocked articles for a wide variety of end uses. For example, in the manufacture of flocked carpet, a base fabric is generally coated with a prime coat to which flock adhesive is subsequently applied. The coated fabric is then flocked in a flocking chamber with beater bars, electrostatic equipment or both. When the flock adhesive has dried, cured or cross-linked, the excess flock is removed and the flocked carpet stored in a roll. Articles having other configurations may be flocked using the above or other appropriate methods depending on their physical shape.

Past methods of making flocked articles present a number of serious problems. In particular, satisfactory adhesion of the flock to the surface of the articles has often been difficult to achieve. In this respect, the flocking techniques have been found to be as nearly critical as the type of substrate base material, flock adhesive and flock utilized. It has also been found that as much as 30 weight percent nonrecoverable loss in flock may occur during manufacture of flocked articles. Referring to the above illustration, tensions in the base fabric due to tight or loose selvages and/or differential thread tensions in the weaving may cause streaking and shading in the flocked surfaces. This problem may be caused by uneven coating of the flock adhesive, differential shrinkage of the fabric or improper flock deposition and orientation.

The problems outlined above may be serious and often times their magnitude depends on the physical shape and size of the final article. In the flocked carpet example described above, an increase in width usually means an increase in the severity of the problems encountered. This may be due to an uneven base fabric, problems of increased torque with beater bars or poor control of a wide electrostatic field.

SUMMARY

In general, the present invention provides a method of centrifugally extruding thermoplastic strands or filaments and impinging them on a substrate base immediately after they have been freed from an extrusion die. The thermoplastic strands or filaments can be formed to any desired thickness and length by removing them from the extrusion die with any known means such as by cutting with a knife or by melt fracture, i.e., the filaments break away from the extrusion orifice under the influence of their own weight.

Direct fusion bonding of the strands or filaments to the substrate base may be achieved if they are compatible with the substrate base, i.e., use of materials forming the strands and substrate base which can be securely bonded together without the aid of an adhesive layer. Bonding of the strands or filaments may also be obtained by applying an adhesive or hot melt layer to the substrate base prior to impinging said strands or filaments thereon, or by using a heat softened thermoplastic substrate base. The adhesive or hot melt layer may be applied to the substrate base by any conventional means such as roller coating, spraying, brushing or extrusion and lamination, including coextrusion of the adhesive layer with the substrate base.

A unique apparatus is used with the method, above described, to make flocked articles which combines a centrifugal extruder with other known means of forming the substrate base such as conventional extruders, calenders, roller coaters or combinations thereof. Centrifugal extruders useful in achieving the present invention are well described in U.S. Pat. Nos. 3,483,281 and 3,358,323, which patents are incorporated in their entirety by reference into this application.

Conventional flock articles such as flock carpets or fabric supported apparel materials can be made by utilizing the apparatus and method herein described. In addition, a unique flock article can be achieved, wherein one end of the strands or filaments penetrate into the matrix of a soft substrate base material before fusion or bonding of the strands or filaments with the substrate base. In order to achieve the unique flocked article, the substrate base material is defined as being soft enough to allow penetration of the rapidly moving strands or filaments after they leave the extrusion die. Such a substrate base material may be achieved by heat softening it to the point where the strands or filaments can penetrate into the matrix thereof or by using an inherently soft substrate base such as thermoplastic organic resinous foam material.

By forming a flocked article wherein the strands have penetrated into the matrix of the substrate base, better stand-up characteristics of the strands or filaments can be achieved. Also as will be noted in more detail in the preferred embodiments, a more secure attachment of the strands or filaments to the substrate base can be achieved without the need of an adhesive layer therebetween when the strands or filaments and the substrate base are formed from different materials which are incompatible, i.e., materials which do not readily bond together. An additional advantage may be achieved if it is desired to maintain soft or resilient characteristics in the base substrate, in that no adhesive layer would be required.

The physical properties of the materials used to form the strands or filaments and the substrate base will depend upon the end product specifications. Inexpensive resins may be used for carpeting while in the case of apparel, materials should be chosen which are resistant to dry cleaning and washing, and have desired properties of soft hand, cold temperature flex, etc. For example, the substrate base may be formed from synthetic resinous materials such as polyolefins, styrene polymers, acrylonitrile/butadiene/styrene resin, vinyls acrylics, polyamides (nylon), polyacetals, polyurethanes, epoxies, polyallomers, cellulosics, polyacrylonitriles, or copolymer compositions thereof. In addition, other thermoplastic materials such as foams of all kinds and glass may also be used as a substrate base material. It is further noted that the substrate base need not necessarily be a thermoplastic material in that wood, metal, thermoset organic resins and the like are usable.

The strands or filaments may be formed from any thermoplastic material which can be centrifugally extruded such as rayon, vinyls, polyamides (nylon), polyesters (Dacron), polyolefins, acrylics, acrylonitriles or other like copolymer compositions thereof. Glass is also considered a thermoplastic material useful in forming strands or filaments in accordance with the present invention.

If it is desirable to bond the strands or filaments to the substrate base with an adhesive or hot melt layer, a wide variety of materials may be used depending upon the end product specifications. For example, adhesives may be obtained by blending polymers or making copolymers of the same or different materials used to make the strands or filaments and the substrate base. In addition, the adhesive layer may be simply dried to form the bond, or may be cross-linked or cured on an immediate or delayed control basis. Many adhesive compositions for bonding a variety of materials are known in the art and would be properly selected by persons skilled in the art for the present invention.

Accordingly, the present invention has among its objects the provision of a method for making flocked articles by utilizing centrifugal extrusion of strands or filaments and then impinging the same on a substrate base to form flocked articles. Another object of the present invention is the provision of an apparatus which combines a centrifugal extruder with other means of forming base substrates to form flocked articles. Still another object of the present invention is the provision of a unique flocked article wherein one end of strands or filaments forming the flocked surface are penetrated into the matrix of the substrate base before bonding or fusing thereto. Yet, additional objects and advantages of the present invention will be apparent to those skilled in the art in view of the present specification, drawings and claims.

BRIEF DESCRIPTION OF THE DRAWINGS

The preferred embodiments of the present invention are shown in the accompanying drawing where like characters of reference designate corresponding materials and parts throughout the several views thereof in which:

FIG. 1 is a top view which illustrates schematically an apparatus used to make a flocked article in accordance with the present invention;

FIG. 2 is an elevation view further illustrating the apparatus of FIG. 1;

FIG. 3 is a plan view which illustrates schematically another preferred embodiment of an apparatus used to make flocked articles in accordance with the present invention;

FIG. 4 is an exaggerated cross-sectional view of a flocked article made in accordance with the present invention;

FIG. 5 is an exaggerated cross-sectional view of a modified flocked articles made in accordance with the present invention; and FIG. 6 is an exaggerated cross-sectional view of a preferred embodiment showing a unique flocked article made in accordance with the present invention.

DESCRIPTION OF THE PREFERRED EMBODIMENTS

The following description illustrates the manner in which the principles of the invention are applied but are not to be construed as limiting the scope of the invention.

More specifically referring to FIGS. 1 and 2, an apparatus 10 for making flocked articles is illustrated. Apparatus 10 has an extruder 12 with an extrusion head 13 for extruding a thermoplastic organic synthetic resinous substrate base 14. Immediately after the base 14 has been formed and is still in a heat softened condition, rapidly moving strands or filaments 19 of a thermoplastic organic resinous material are impinged on the base 14. The strands or filaments 19 are formed by centrifugal extrusion in a centrifugal extruder 15, not shown in complete detail, and freed therefrom by a knife 20 before advancing to impinging contact with the base 14. In order to achieve full width coverage of the strands or filaments 19 on the base 14, the centrifugal extruder 15 is traversed from one side to the other of the base 14, as illustrated by the double headed arrow 11. As previously noted, other means of forming the substrate base 14 can be used such as a calender or roller coater.

The now flocked substrate base 14' having strands or filaments 19' secured thereto is advanced through a cooling means 16 to solidify the strands or filaments 19' and base 14', and form a secure bond therebetween. Thereafter, any loose strands or filaments 19' are removed from the base 14' by vacuum means 17 and recycled to the extruder 15. The flocked base 14' is then placed in a roll 18 for storage.

The substrate base 14 and flocked substrate base 14' are supported by rollers 21 as they advance through the apparatus 10.

Referring now to FIG. 3, another apparatus 30 for making flocked articles is illustrated. Apparatus 30 has an extruder 32 with a circular extrusion head 33 for extruding a thermoplastic organic resinous substrate base tube 34. As shown in FIG. 3, air is introduced through the extrusion head 33 to form a bubble in the advance base tube 34. Immediately after the base tube 34 has been formed and is still in a heat softened condition, rapidly moving strands or filaments 31 of a thermoplastic organic resinous material are impinged on the inside surface of the base tube 34. The strands or filaments 31 are formed by a centrifugal extruder 35, not shown in complete detail, which extends through the extrusion head 33 into the interior of the base tube 34.

The strands or filaments 31 may be freed from the centrifugal extruder with a knife or knives, not shown in FIG. 3, which would rotate in the opposite direction relative to the rotation of the extrusion head of the centrifugal extruder 35 to insure complete coverage of the strands or filaments 31 on the interior surface of base tube 34. Also, melt fracture of the strands or filaments 31 from the extruder 35 is particularly suited to apparatus 30 and, as hereinafter described, provides a substantial contribution to a unique flocked article. Proper control of the melt fracture of strands or filaments 31 is dependent on several variables such as the type of thermoplastic material forming the strands or filaments 31, the extrusion temperature and melt viscosity of the same, the centrifugal speed of the extruder 35, and size and cross-sectional shape of the extrusion orifices in the extruder 35.

The now internally flocked substrate base tube 34' having strands or filaments 31 secured thereto is advanced through squeeze nip or pinch rollers 36, after sufficient air cooling or other cooling means has been provided to solidify the strands or filaments 31 and the base tube 34', and form a secure bond therebetween. The squeeze rollers 36 serve simply to maintain an air bubble in tube 34' and do not act as impression rollers.

A mandrel inserted into base tube 34' would accomplish the same purpose. After the flocked base tube 34' passes between the squeeze rollers 36, it is advanced through a slitter 37 where it is slit longitudinally to appear therefrom as a conventional web-like material. Thereafter, any loose strands or filaments 31 are removed from the flocked base 34' by vacuum means 38 and recycled to the extruder 35. The flocked base 34' is then placed in a roll 39 for storage.

Apparatus 30 is particularly suited for making web-like flocked articles which are extremely wide. Another advantage of using apparatus 30 is the capability of multiaxially orientating the base tube 34, thereby substantially improving its strength and toughness characteristics.

Referring now to FIGS. 4 and 5, conventional flocked articles are illustrated which can be produced by the method and apparatus previously described. FIG. 4 illustrates a flocked article 40 having a substrate base 42 and strands or filaments 44 of a thermoplastic organic resinous material which have been fusion bonded together, as shown at 46. FIG. 5 illustrates another flocked article 50 having a base fabric 52 to which a prime coat 54 has been applied. A flock adhesive 56 is then applied to the prime coat 54 and thermoplastic organic resinous strands or filaments 58 securely bonded thereby, as shown at 59. The strands or filaments 44 and 58, shown in FIGS. 4 and 5, may be produced by centrifugal extrusion and used to form the flocked articles 40 and 50 by the method and apparatus herein disclosed.

Referring now to FIG. 6, a unique flocked article 60 is illustrated. FIG. 6 has been split into sections A and B to further illustrate two preferred embodiments of the article 60. Both sections A and B of article 60 having a thermoplastic organic resinous foam substrate base 62. However, section A of the flocked article 60 illustrates strands or filaments which have been freed from a centrifugal extruder by melt fracture and then one end thereof embedded and fused or bonded into the matrix of the foam substrate base 62, as shown at 66, whereas section B illustrates strands or filaments 64 which have been freed from a centrifugal extruder with a cutting knife before one end thereof has been embedded and fused or bonded into the matrix of the foam substrate base 62, as shown at 68.

Although both section A and B of article 60 will result in improved bonding characteristics of the strands or filaments 63 and 64 to the foam substrate base 62, section A particularly provides improved results in that there is shown bulbous end portions, as shown at 66, on the embedded ends of the strands or filaments 63 which are characteristic of melt fracture during centrifugal extrusion thereof.

Although the embedding of strands or filaments 63 and 64 into the matrix of substrate base 62 is not fully understood, it is believed to be a combination of penetration of the rapidly moving strands or filaments 63 and 64 plus some melting of the substrate base 62 during penetration before fusion or bonding occurs. Also, irrespective of the fact that a thermoplastic organic resinous foam substrate base 62 is illustrated, other thermoplastic nonfoam substrate bases will accomplish a similar result to form unique flocked articles like that shown in FIG. 6.

Although the invention herein described contemplates forming sheet like flocked articles, it can be used to form flocked articles having different shapes and configurations. It is further understood that the scope of the invention is not limited by the shape, length or thickness of the centrifugally extruded strands or filaments. It is still further noted that the scope of the present invention is not limited by the type of material used to form the strands or filaments and the substrate base, except that the strands or filaments must be capable of being centrifugally extruded, or by the use or nonuse of adhesive layers, or by the width, thickness or configuration of the substrate base, or by the combination of layers used to form a flocked article. Thus, while certain representative embodiments and details have been shown for the purpose of illustrating the invention, it will be apparent to those skilled in the art that various changes and modifications can be made therein without departing from the spirit and the scope of the invention.

What is claimed is:

1. A method of forming flocked articles comprising:
   a. providing a substrate base;
   b. centrifugally extruding thermoplastic strands or filaments from a centrifugal extruder;
   c. freeing said strands or filaments from said centrifugal extruder thereby causing said strands or filaments to move rapidly away from said centrifugal extruder; and
   d. impinging said rapidly moving strands or filaments on said substrate base thereby causing said strands or filaments to adhere to said substrate base.

2. The method of claim 1 wherein said freeing of said strands or filaments from said centrifugal extruder is accomplished by cutting said strands or filaments with a knife.

3. The method of claim 1 wherein said freeing of said strands or filaments from said centrifugal extruder is accomplished by melt fracture of said strands or filaments.

4. The method of claim 1 wherein said impinging of said strands or filaments on said substrate base is followed by said strands or filaments being securely bonded thereto.

* * * * *